Dec. 16, 1952     B. AMES     2,621,616

METHOD OF BAKING

Filed July 19, 1946

Inventor
Butler Ames
by Roberts Cushman Grainer
Att'ys

Patented Dec. 16, 1952

2,621,616

UNITED STATES PATENT OFFICE 2,621,616

METHOD OF BAKING

Butler Ames, Boston, Mass.

Application July 19, 1946, Serial No. 684,885

2 Claims. (Cl. 107—54)

This invention pertains to a novel method of baking, etc. Customarily bread and cake dough is placed in an open topped pan and subjected to heat predominantly applied to the pan bottom, the upper surface of the dough being exposed to the hot air within an oven chamber. In accordance with this customary procedure the baking time for a bread loaf is of the order of one hour.

The object of the present invention is to provide a novel method of baking, for example in baking bread, cake, or the like, whereby the time of baking is very substantially reduced while at the same time insuring uniformity of results and a better product.

This object is attained by baking the food, for example bread or cake, in a closed receptacle and applying the heat predominantly to the top or cover of the receptacle. The dough is first warmed in a steamy atmosphere so that it is free to rise to the fullest extent and is then subjected to intense heat in a still atmosphere devoid of convection currents. In accordance with this method the evolution of visible water vapor from the receptacle ceases in about 15 minutes and the loaf is fully baked in approximately half the time required in accordance with usual practice. Moreover loaves so baked are very uniform in appearance, of fine texture and of excellent flavor.

In the accompanying drawings wherein one embodiment of apparatus useful in the practice of the method is illustrated by way of example:

Figure 1:
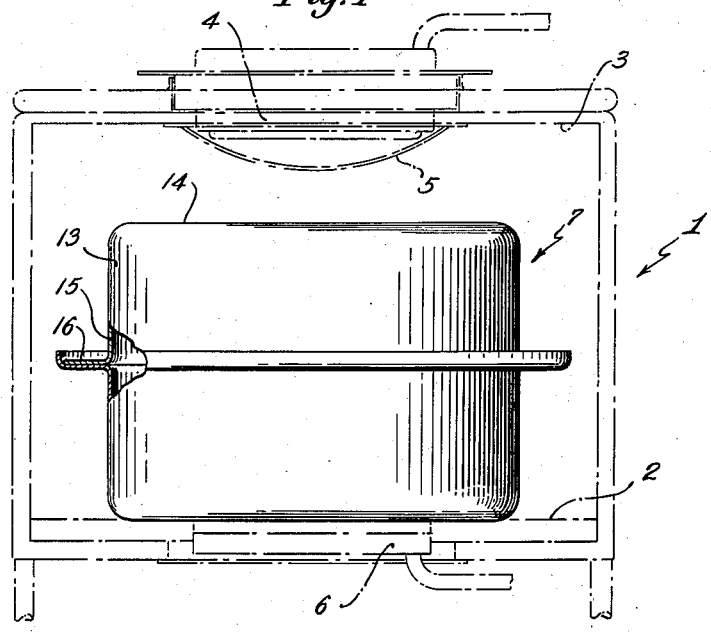
Fig. 1 is a side elevation of one form of closed container useful in the practice of the invention (with a portion broken away and in vertical section) the container being illustrated as enclosed in an oven-like structure having provision for directing intense radiant heat energy downwardly against the cover of the receptacle and for supplying more moderate heat to the bottom of the receptacle.

Referring to the drawings, the numeral 1 designates an oven structure shown in broken lines, having a door (not shown) giving access to its interior and having insulated walls, the oven having a bottom wall 2 and a top wall 3 and preferably being lined with a reflecting material, for example sheet aluminum. The top wall is provided with a central aperture in which is arranged an energy source 4, for example an electrical heating coil which may be supplied with current and which is designed to emit intense glowing radiant heat energy in a downward direction. Below this heat source 4 there is preferably arranged a downwardly convex metal grill or grid 5 which may, for example, be of stainless steel, coated with a baked on refractory cement or enamel and designed to protect the heating source 4 from mechanical injury. This grill or grid 5 is electrically insulated from the oven top. The bottom 2 of the oven is also provided with an aperture which receives a heat source 6 which may likewise be an electrical heating coil supplied, but preferably the source 6 is designed to emit less energy than the coil of the heating source 4 so that only a moderate amount of heat is provided by the source 6 as compared with that emitted from the source 4. The oven chosen for illustration has the characteristic features of that more fully described and illustrated in application for Letters Patent, Serial No. 673,267, filed May 31, 1946, by Butler Ames.

Figure 2:
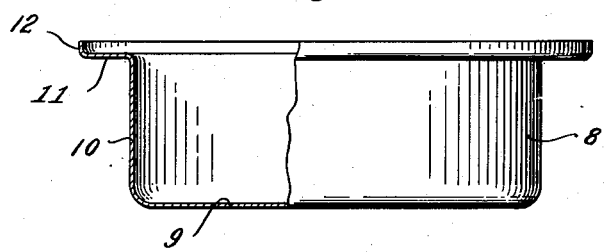
Fig. 2 is a side elevation, partly in vertical section, illustrating one desirable form of base or pan constituting a part of the receptacle.

In accordance with the present invention the dough to be baked is placed within a receptacle 7 which is disposed in the oven chamber so that it is immediately beneath the heat source 4. As illustrated in Figs. 1 and 2, the receptacle 7 comprises the bottom member or pan 8, here shown (Fig. 2) as having the bottom 9, a cylindrical side wall 10, a radial flange or support 11 and an upturned retaining lip 12. Associated with this pan or bottom member 8 is a cover 13 preferably of substantially the same diameter as the pan 8 and having a top 14, a cylindrical side wall 15 and a radial flange 16. As illustrated, the cover is of nearly the same vertical height as the pan, thus providing ample space within the receptacle for the loaf of bread after it has fully risen. The flange 16 is of a diameter such that it may be arranged to rest upon the flange of the support 11 with its edge just inside the lip 12 of the pan, the lip thus serving to prevent the cover from moving horizontally relatively to the pan. The support 11 and the flange 16 have substantially flat contacting surfaces so that when assembled there is a close joint between the pan and cover, it being noted that the pan and cover are devoid of any apertures through which steam might escape, so that the only escape for steam is between the closely fitting members 11 and 16.

In use, the dough is placed in the pan 8 and the cover is put in place and then the receptacle is arranged within the oven device 1 so that the bottom of the pan is directly above the heat source 6 and the top 14 of the cover is immediately below the heat source 4. When the heat sources are energized the bottom of the pan is gradually warmed while the top of the cover is subjected to intense glowing radiant heat energy. The pan bottom 8 may be of stainless steel, if desired, or it may be of aluminum, the cover 13 being of aluminum or similar material which readily conducts heat energy. As the dough is warmed, water vapor is gradually evolved but is confined within the restricted chamber afforded by the pan and its cover and only escapes after the pressure within the receptacle has increased sufficiently above atmospheric pressure to raise the cover slightly from the support 11. In this steamy atmosphere the dough rises very freely and very uniformly and with great rapidity. After approximately 15 minutes, the evolution of steam from between the parts 11 and 16 is no longer observable. The upper surface of the dough is now subjected to intense heat within the cover, but under slight, usually somewhat less, pressure than during rising in a still atmosphere in which there is substantially no chance for the flow of convection air currents. The result is that the loaf is uniformly browned and being baked under slight pressure it is of very fine texture, and uniform in consistency and external appearance.

Figure 3:
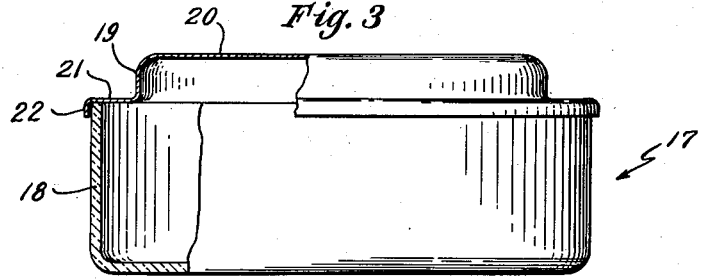
Fig. 3 is a side elevation partly broken away and in vertical section illustrating a receptacle of modified construction.

In Fig. 3 a modified receptacle 17 is illustrated wherein the lower part of the pan 18 is of glass or ceramic material. In this instance the cover 19 is relatively shallow, having the top 20, the horizontal flange 21 and the downturned lip 22. The flange 21 rests upon the upper edge of the pan 18 with the lip 22 engaging the outer surface of the pan so as to prevent the cover from slipping sidewise. In this instance the cover is of a material which readily conducts heat energy, for example it may be of aluminum, although stainless steel may be employed. With this arrangement the pan 18 is deeper in proportion to the depth of the cover than in the arrangement shown in Fig. 1, it being understood that the combined vertical depth of the pan and cover will be sufficient to accommodate the risen loaf.

While certain desirable embodiments of the invention have been illustrated by way of example it is to be understood that the invention is broadly inclusive of all modifications falling within the scope of the appended claims.

I claim:

1. That method of baking leavened bread dough which comprises as steps confining the raw dough in a receptacle of a size ample to permit the dough to rise freely to the maximum extent, maintaining a super-atmospheric pressure therein during baking, subjecting the dough to moderate bottom heat while directing relatively intense radiant heat downwardly toward and substantially uniformly over the upper surface of the dough, shielding the upper surface of the dough while the dough is rising by a blanket of water vapor evolved from the dough, permitting the evolved water vapor in excess of that required to shield the dough and maintain the super-atmospheric pressure to escape from the receptacle as visible water vapor, and after the excess visible vapor ceases to escape, continuing the process so as to convert the confined water blanket into invisible water vapor, thus fully exposing the dough to the action of the downwardly directed radiant heat long enough to effect browning of the dough surface.

2. That method of baking leavened bread dough which comprises as steps placing the raw dough in a receptacle having a cover capable of conducting heat, the receptacle and cover closely contacting thereby to exclude the ambient air, the space within the covered receptacle being ample to accommodate the dough when risen to its maximum extent, maintaining a super-atmospheric pressure in said receptacle during baking, applying moderate heat to the bottom of the receptacle and directing relatively intense glowing radiant energy downwardly against the cover of the receptacle, shielding the upper surface of the dough while the dough is rising by a blanket of water vapor evolved from the dough, permitting the evolved water vapor in excess of that required to shield the dough and maintain the super-atmospheric pressure to escape as visible water vapor by separation of the cover and receptacle, and after the excess visible vapor ceases to escape, continuing the process so as to convert the confined water blanket into invisible water vapor, thus fully exposing the dough to the action of the downwardly directed radiant heat long enough to effect browning of the dough surface.

BUTLER AMES.

REFERENCES CITED

The following references are of record in the file of this patent:

UNITED STATES PATENTS

| Number | Name | Date |
|---|---|---|
| 1,411,223 | Retzbach | Mar. 28, 1922 |
| 1,442,931 | Faelchle | Jan. 23, 1923 |
| 1,630,237 | Smith | May 24, 1927 |
| 2,087,912 | Horlebeck et al. | July 27, 1937 |
| 2,340,354 | Wells | Feb. 1, 1944 |
| 2,367,007 | Cossin | Jan. 9, 1945 |